United States Patent [19]

Tomisawa et al.

[11] 3,824,379

[45] July 16, 1974

[54] VARIABLE FREQUENCY DIVIDING CIRCUIT

[75] Inventors: Norio Tomisawa; Yasuji Uchiyama; Takatoshi Okumura, all of Hamamatsu, Japan

[73] Assignee: Nippon Gakki Siezo Kabushiki Kaisha, Shizuoku-ku, Japan

[22] Filed: Dec. 27, 1972

[21] Appl. No.: 319,064

[30] Foreign Application Priority Data

Dec. 30, 1971 Japan .................................. 46-1500
Dec. 30, 1971 Japan .................................. 46-1501

[52] U.S. Cl. ... 235/92 PE, 235/92 CA, 235/92 NG, 235/92 R, 328/48

[51] Int. Cl. .......................................... H03k 21/36

[58] Field of Search ...... 235/92 CA, 92 NG, 92 PE, 235/92 DM, 92 MA; 328/48

[56] References Cited

UNITED STATES PATENTS

| | | | |
|---|---|---|---|
| 3,278,727 | 10/1966 | Geis | 235/92 PE |
| 3,742,195 | 6/1973 | Randle | 235/92 DM |

*Primary Examiner*—Paul J. Henon
*Assistant Examiner*—Joseph M. Thesz, Jr.
*Attorney, Agent, or Firm*—Ladas, Parry, von Gehr, Goldsmith & Deschamps

[57] ABSTRACT

The output of each stage of a binary counter having a plurality of cascade-connected stages is connected to one input terminal of a corresponding coincidence circuit. A temporary memory is provided for storing a frequency dividing number n in the form of a binary information, and the output of each stage thereof is connected to another input terminal of the corresponding coincidence circuit. When the contents of the binary counter coincide with those of the temporary memory, the outputs of the whole coincidence circuits pass through an AND circuit to reset the binary counter, thereby constituting a ring counter with a scale of n. Therefore, the output frequency of the AND circuit is $1/n$ of the input pulse. This dividing number n is variable in accordance with binary information to be stored in the temporary memory. The variable frequency dividing circuit of the type described above is applicable to a tone generator system for an electronic musical instrument.

1 Claim, 3 Drawing Figures

VARIABLE FREQUENCY DIVIDING CIRCUIT

This invention relates to a variable frequency dividing circuit, and, more particularly, to a variable frequency dividing circuit which is capable of producing an output pulse having a desired divided frequency upon receiving information which corresponds to the desired frequency. The invention relates also to a tone generator system for an electronic musical instrument utilizing this variable frequency dividing circuit.

There is a prior art frequency dividing circuit which consists of a plurality of flip-flops connected in series. In this circuit, various frequency divided outputs are obtainable by switching a feed-back connection between the output terminal of each stage and the input terminal of a required stage of the circuit. This type of frequency dividing circuit is effectively capable of switching the connection in the above described manner if it is constructed of two or three flip-flops connected in series. If, however, a frequency divided output is to be obtained by using a large frequency dividing number, this type of circuit cannot be put to a practical use because the construction for switching the connection becomes extremely complicated.

Thre is another type of frequency dividing circuit which employs a ring counter for obtaining a frequency divided output. This type of circuit is disadvantageous in that the number of required stages increases as the frequency dividing number becomes large and therefore it is not suitable for a practical use from an economic standpoint.

Again, a prior art tone generator system for an electronic musical instrument such as an electronic organ has a plurality of oscillators corresponding to respective manual or pedal keys and tone signals are obtained from the outputs of these oscillators. Another type of a prior art tone generator system obtains tone signals from independent oscillators provided respectively for twelve notes of the highest octave and obtains tone signals for notes of octaves below the highest octave by successively dividing by two the frequencies of the outputs of the oscillators by means of frequency dividers. It will be noted from the foregoing that all of the above described prior art tone generator systems have tone signals prepared in advance. However, these prior art tone generator systems require a large number of circuits. Moreover, tuning of each oscillator or divider is very difficult and an accurate musical scale can hardly be obtained in these prior art system.

It is, therefore, a general object of the invention to provide a variable frequency dividing circuit which has eliminated the above described disadvantages of the prior art circuits and is capable of producing outputs over a wide range of frequency dividing numbers with a very simple construction.

It is another object of the invention to provide a variable frequency dividing circuit which comprises a binary counter having a plurality of stages and receiving input pulses at a frequency to be divided, a temporary memory for temporarily storing binary information corresponding to a frequency dividing number for dividing the frequency of the input pulse to obtain an output having a desired divided frequency, a logic circuit for detecting coincidence of contents of the binary counter with those of the temporary memory and producing an output pulse and resetting said binary counter when the circuit has detected the coincidence and a circuit for providing the required binary information to the temporary memory.

It is another object of the invention to provide a tone generator system for an electronic musical instrument which is of a simple construction and is capable of freely producing a desired musical scale.

It is still another object of the invention to provide a tone generator system for an electronic musical instrument which comprises a frequency information memory for storing a plurality of information respectively representing frequencies of a plurality of tone signals, a read-out control circuit for reading out a frequency information corresponding to a depressed key and a variable frequency dividing circuit of a construction as described above. A tone signal is obtained from the output of a predetermined frequency dividing circuit by causing information corresponding to a depressed key to be stored in the temporary memory of the frequency dividing circuit.

Other objects and features of the invention will become apparent from the description made hereinbelow with reference to the accompanying drawings in which.

Figure 1:
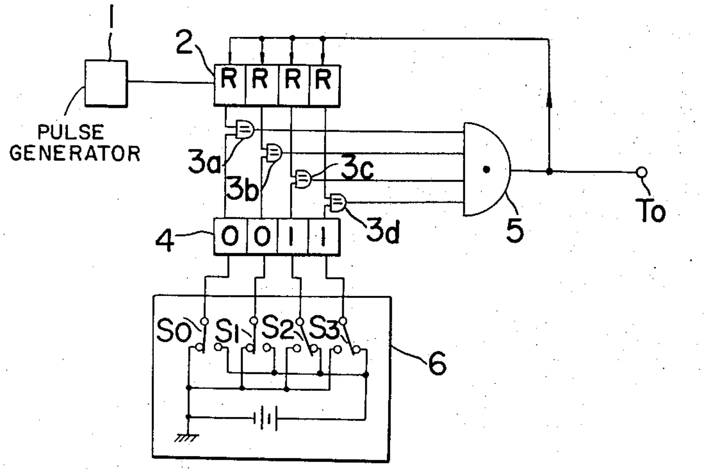
FIG. 1 is a block diagram showing one embodiment of a variable frequency dividing circuit according to the invention.

In FIG. 1, a pulse generator 1 produces pulses at a frequency of e.g. 1.888 MHz. These pulses are applied to the input of the initial stage of a binary counter 2 having a plurality of, e.g. 4, stages. Each stage of this binary counter 2 typically consists of a flip-flop. A set state of the flip-flop is made logic 1 and a rest state thereof is made logic 0. When pulses are applied from the pulse generator 1, th state of the binary counter 2 successively and repetitiously changes from 0000 through 0001, 0010 . . . 1111, until the binary counter 2 is otherwise reset.

A temporary memory 4 is provided for storing temporarily binary information supplied from a circuit 6, which information corresponds to a dividing number by which the pulse frequency is to be divided to obtain a pulse having a desired frequency. In the present embodiment, any desired binary information corresponding to dividing numbers between 2 and 15 can be stored in the temporary memory 4.

Assume that a desired output to an output terminal $T_o$ is of a frequency which is 1/12 that of the input pulse. In this case, a binary information of 1100 is stroed in the temporary memory 4.

The output of each stage of the binary counter 2 and the output of each bit of the temporary memory 4 are respectively connected to the corresponding inputs of coincidence circuits (or identity logics) 3*a* through 3*d*. Each of the coincidence circuits 3*a* through 3*d* produces output 1 only when the signal applied thereto from one of the stages of the binary counter 2 coincides with the bit signal applied thereto from the temporary memory 4. The outputs of the coincidence circuits 3*a* through 3*d* are respectively applied to the inputs of an AND circuit 5 which produces an output only when it receives signal 1 from all of the coincidence circuits 3a through 3d. The output of the AND circuit 5 is simultaneously fed to each stage of the binary counter 2 as a resetting input.

Since the state of the binary counter 2 intends to change from 0000 . . . toward 1111, during application of the input pulse thereto, all of the coincidence circuits 3a through 3d produce an output pulse at the terminal $T_O$ and, simultaneously, reset the binary counter 2 when the binary counter has counted 1100. Accordingly, the binary counter 2 is reset from the state 1100 to 0000 and repeats the counting again from 0000 up to 1100, and so forth.

Thus, an output pulse is provided at the output terminal $T_O$ each time the binary counter 2 counts 1100. This output pulse has a frequency which is 1/12 that of the input pulse, that is, 0.157 MHz.

It will be understood from the foregoing description that an output pulse having a frequency which is at a desired frequency dividing ratio to the input pulse can be obtained by causing the temporary memory 4 to store a binary information corresponding to the desired dividing number.

Figure 2:
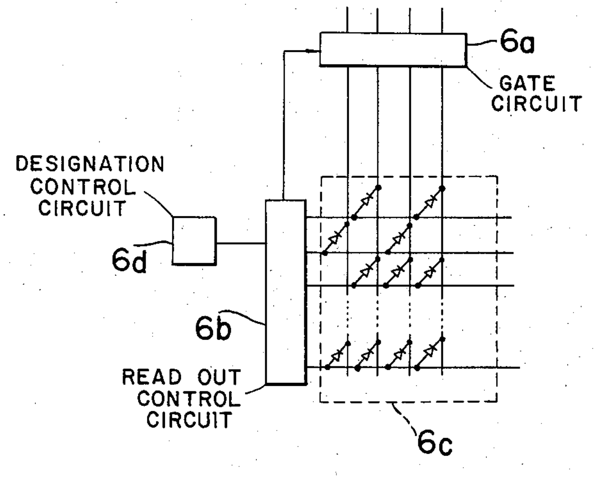
FIG. 2 is a circuit diagram showing one actual example of the frequency dividng number providing circuit shown in FIG. 1.

A known device may be used as the circuit 6 for causing the temporary memory 4 to store the above described binary information. For example, switches $S_0$ through $S_3$ are provided which respectively correspond to the bits of the temporary memory 4 and a binary 0 or 1 is stored in each bit by manipulating these switches $S_0$ through $S_3$. Another example of the circuit 6 is shown in FIG. 2. In FIG. 2, a diode matrix 6c stores a plurality of predetermined information. A particular information among these predetermined information is designated by a designation control circuit 6*d*, read out from the matrix 6c by a read out control circuit 6*b* and fed to the temporary memory 4 by opening of a gate circuit 6*a*. This arrangement is advantageous in that the temporary memory 4 can store the predetermined information easily and rapidly. A read-only memory (ROM) may be used instead of the diode matrix 6*c* for storing a larger number of information. The read-only memory is suitable for obtaining output pulses for a wider range of frequency dividing numbers when it is used with a binary counter and a temporary memory each having a larger number of stages. Alternatively, a random access memory (RAM) has an advantage that a predetermined information stored therein may be changed as desired.

Figure 3:
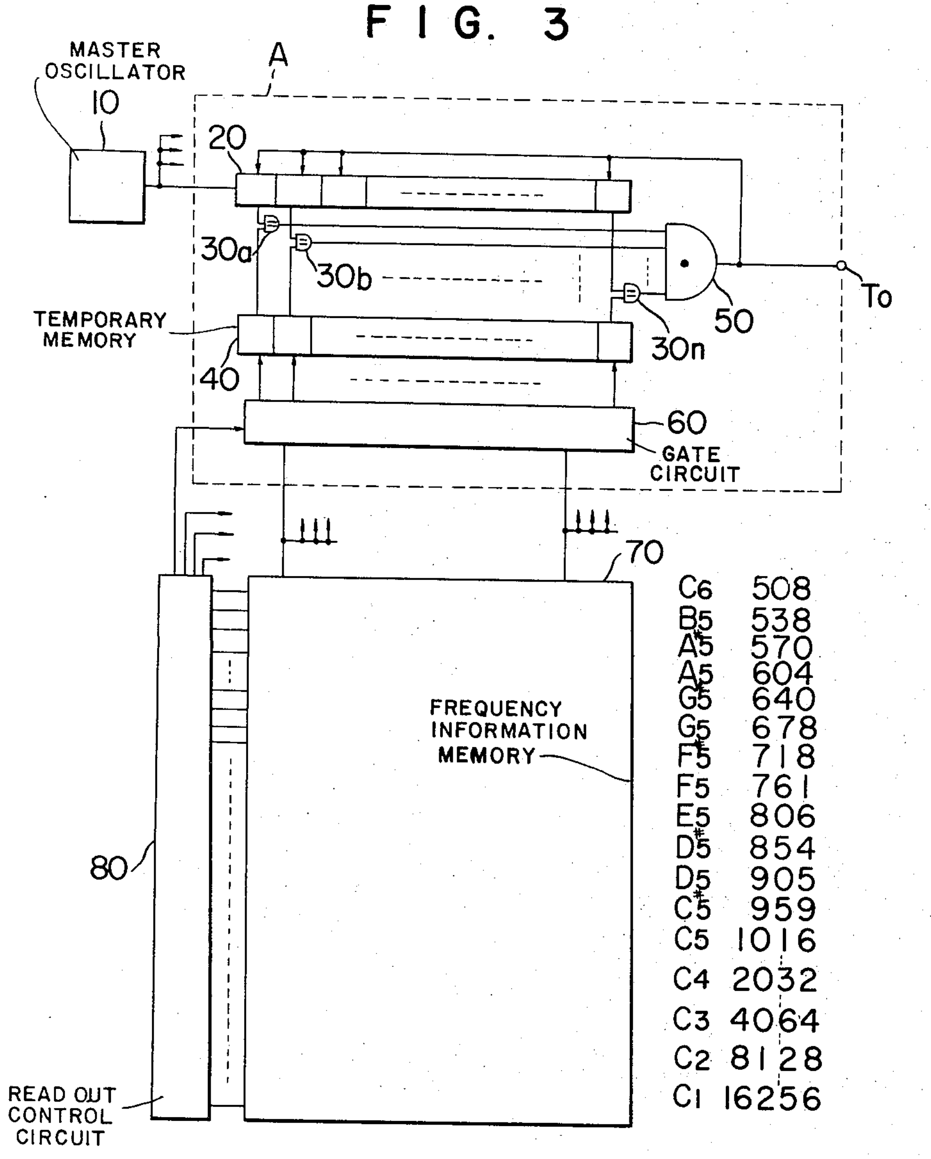
FIG. 3 is a block diagram showing on embodiment of a tone generator system for an electronic musical instrument according to the invention.

FIG. 3 shows one embodiment of a tone generator system for an electronic musical instrument which is provided with variable frequency dividing circuits of the above described type in the same number as a maximum necessary number of tones to be sounded at a time, for instance twelve. Reference numeral 10 designates a master oscillator for generating pulses at a frequency of e.g. 1.888 MHz. A variable frequency dividing circuit A is of a construction similar to the one described with reference to FIG. 1. The variable frequency dividing circuit A is different from the frequency dividing circuit shown in FIG. 1 in that a binary counter 20 and a temporary memory 40 respectively have fourteen stages and the number of coincidence circuits 30*a* to 30*n* is fourteen. The circuit A is also different from the circuit shown in FIG. 1 in that it has a gate circuit 60 on the input side of the temporary memory 40. In FIG. 3, only one variable frequency dividing circuit is illustrated in detail. It will be appreciated, however, that variable frequency dividing circuits of the same type are provided in the same number as the maximum necessary number of tones to be sounded at a time. The binary counter 20 of each frequency dividing circuit receives pulses from the master oscillator 10, the outputs of a frequency information memory 70 which will be described later are applied to the input terinals of the gate circuit 60, and opening and closing operations of the gate circuit 60 are controlled by the control output of a read-out control circuit 80.

Pulses from the master oscillator 10 are applied to the initial stage of the binary counter 20. Each stage of the binary counter 20 consists of a flip-flop. A set state of the flip-flop is made logic 1 and a reset state thereof is made logic 0. Accordingly, a counting of the binary counter 20 successively and repetitiously changes from 00000000000000 to 00000000000001, 00000000000010 . . . 11111111111111.

The output terminal of each stage of the binary counter 20 and the output terminal of each bit of the temporary memory 40 are respectively connected to the input terminals of the coincidence circuits 30*a* through 30*n*. Each of the coincidence circuits 30*a* through 30*n* produces an output 1 only when the input signal applied thereto from the binary counter 20 coincides with the input bit signal applied thereto from the temporary memory 40. The outputs of the coincidence circuits 30*a* through 30*n* are respectively applied to the inputs of an AND circuit 50 which produces an output only when it receives signal 1 from all of the coincidence circuits 30*a* through 30*n*. The output of the AND circuit 50 is simultaneously fed to each stage of the binary counter 20 as a reset input.

Assume that a frequency information represented by a binary 11111110000000 which corresponds to a decimal 16256 is stored in the temporary memory 40. The binary counter 20 continues its counting operation during application thereto of the pulses from the master oscillator 10. When it has counted 11111110000000, all of the coincidence circuits 30*a* through 30*n* produce outputs whereby the AND circuit 50 provides an output at the terminal $T_0$ and simultaneously resets the binary counter 20. Accordingly, the binary counter 20 is reset from 11111110000000 to 00000000000000 and repeats the counting.

Thus, an output pulse is provided at the output terminal $T_0$ each time the binary counter 20 counts 11111110000000. This output pulse has a frequency obtained by dividing the input pulse by a decimal number 16256 which corresponds to the binary 11111110000000.

It will be apparent from the above description that a tone signal corresponding to the frequency informatin stored in the temporary memory 40 is taken out from the terminal $T_0$.

A frequency information memory 70 stores a predetermined number of frequency information corresponding to the number of tone signals to be obtained. If, for example, there are 61 keys from $C_2$ through $C_7$ in a keyboard, 61 frequency information corresponding to 61 tone signals are stored in the memory 70. This memory 70 consists, for example, of a diode matrix which stores 61 words, each word being composed of 14 bits. Each frequency information can be selected at a suitable binary number in accordance with the frequency of a tone signal to be obtained. In the present embodiment in which the frequency of the clock pulse is 1.888 MHz, decimal numbers shown at the right of the frequency information memory 70 are stored in the memory 70 in the form of binary numbers. According to the above selection, the error in the frequency of the tone signal obtained is within 1.03 cents of an equal temperament scale. This error is more than acceptable and a sufficiently practical tone signal can be obtained. A read-only memory (ROM) may of course be used as the frequency information memory 70. In this case, the device becomes more compact and more information can be stored than in the case of using the diode matrix. A random access memory (RAM) may also be used. In this case, the stored information can be changed even after the memory is assembled into the electronic musical instrument.

Since the frequency information memory 70 can store frequency information in any desired digital word, not only tone signals of an equal temperament scale but also those of a just intonation scale and an Arabian scale may be produced by this device.

The read-out control circuit 80 reads out information corresponding to a depressed key on the keyboard from the frequency information memory 70 and causes the gate circuit 60 of a predetermined frequency dividing circuit among the plurality of frequency dividing circuits to open thereby causing the temporary memory 40 to store the read-out information. Thus, a tone signal corresponding to the frequency information is obtained from the predetermined frequency dividing circuit.

The gate circuit 60 which has been opened in the above described manner is thereafter closed immediately. When another key is depressed, a different information corresponding to the depressed key is stored temporarily in another predetermined frequency dividing circuit whereby a tone signal having a frequency corresponding to the key is obtained.

In the embodiments shown in FIGS. 1 through 3, the binary counters have been described as having scales of 4 and 14 stages respectively. However, the scale of the binary counter is not limited to the above but any suitable scale may be selected in accordance with a range of dividing number for obtaining an output at a desired frequency.

What we claim is:

1. A variable frequency dividing circuit for obtaining an output having a desired divided frequency, comprising a binary counter having a plurality of stages and receiving input pulses at a frequency to be divided, a temporary memory for temporarily storing frequency information which corresponds to a required frequency dividing number, a logic circuit for detecting coincidence of contents of said binary counter with those of said temporary memory bit by bit and producing an output pulse and resetting said binary counter when coincidence exists in all of the bits, and circuit means for designating a desired frequency dividing number comprising a frequency information memory circuit for storing a plurality of preselected frequency information, a gate circuit connected to the out put terminal of said memory circuit, a designation control part for designating a particular frequency information and a readout control circuit for reading out the frequency information designated by said designation control part from said frequency information memory circuit and controlling said gate circuit.

* * * * *